United States Patent

Shen

(10) Patent No.: US 9,426,691 B2
(45) Date of Patent: Aug. 23, 2016

(54) LOAD BALANCING METHOD AND RELATED WIRELESS COMMUNICATION DEVICE

(71) Applicant: Wistron NeWeb Corporation, Hsinchu (TW)

(72) Inventor: Sheng-Kun Shen, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 492 days.

(21) Appl. No.: 13/781,766

(22) Filed: Mar. 1, 2013

(65) Prior Publication Data

US 2014/0036678 A1 Feb. 6, 2014

(30) Foreign Application Priority Data

Aug. 1, 2012 (TW) .............................. 101127741 A

(51) Int. Cl.
*H04W 28/02* (2009.01)
*H04W 16/08* (2009.01)
*H04W 52/34* (2009.01)
*H04W 16/32* (2009.01)
*H04W 52/14* (2009.01)

(52) U.S. Cl.
CPC ......... *H04W 28/0289* (2013.01); *H04W 16/08* (2013.01); *H04W 52/343* (2013.01); *H04W 52/346* (2013.01); *H04W 16/32* (2013.01); *H04W 52/143* (2013.01)

(58) Field of Classification Search
None
See application file for complete search history.

(56) References Cited

U.S. PATENT DOCUMENTS

| | | | |
|---|---|---|---|
| 2004/0152420 A1* | 8/2004 | Redi | H04W 52/10 455/67.11 |
| 2004/0229621 A1* | 11/2004 | Misra | 455/445 |
| 2005/0176419 A1* | 8/2005 | Triolo | H04W 52/343 455/423 |
| 2007/0146162 A1* | 6/2007 | Tengler et al. | 340/905 |
| 2012/0208581 A1* | 8/2012 | Ishida et al. | 455/509 |
| 2012/0258764 A1* | 10/2012 | Asaoka et al. | 455/522 |
| 2012/0315948 A1* | 12/2012 | Frenger | H04W 52/0232 455/522 |
| 2014/0302889 A1* | 10/2014 | Gale | H01Q 1/246 455/552.1 |

FOREIGN PATENT DOCUMENTS

| | | |
|---|---|---|
| CN | 1792108 A | 6/2006 |
| TW | 200952370 | 12/2009 |

* cited by examiner

*Primary Examiner* — Chirag Shah
*Assistant Examiner* — Amar Persaud
(74) *Attorney, Agent, or Firm* — Winston Hsu; Scott Margo

(57) ABSTRACT

A load balancing method for a wireless communication device includes checking a total loading of the wireless communication device, wherein the total loading comprises a first loading of an omni antenna and a second loading of a directional antenna; and adjusting transmission power of the wireless communication device according to the total loading of the wireless communication device and information sent by at least one neighbor wireless communication device, in order to perform load balancing.

12 Claims, 5 Drawing Sheets

LOAD BALANCING METHOD AND RELATED WIRELESS COMMUNICATION DEVICE

BACKGROUND OF THE INVENTION

1. Field of the Invention

The present invention relates to a load balancing method and a related wireless communication device, and more particularly, to a load balancing method for a wireless communication device and the related wireless communication device.

2. Description of the Prior Art

A wireless network system usually includes a plurality of access points (AP). A device at each access point performs communication with one or several personal communication devices (such as mobile phones, laptops or other portable communication devices) in a wireless manner. These personal communication devices include a wireless network interface card (WNIC) for dealing wireless signals to connect with the device at the access point, e.g. frequency scanning, wireless packet detection and transmission, etc.

Since wireless communication technology has been rapidly developed, utilization rate of the wireless network has been rising. Common standards for the wireless network include IEEE802.11a, IEEE802.11b, IEEE802.11g and IEEE802.11n, and almost all new wireless network cards provided by the vendors is capable of supporting these four standards. When a laptop is connecting the wireless network, the wireless network card of the laptop has to firstly scan whether there are any available access points existing in the area where the laptop is located, and then makes a request to establish the connection with the access point. Since the setting fee of the wireless network becomes lower, there maybe several access points distributed in the same public place. For example, there may be five access points set in the building, wherein two comply with the standard of IEEE802.11a, two comply with the standard of IEEE802.11b/g/n, and one complies with the standard of IEEE802.11b. Therefore, when the wireless network card can support all of the above four standards, the user can connect any one of these access points arbitrarily according to his/her preference, or the operating system selects a desired access point automatically according to power magnitudes of the above five access points. However, the above access point selecting method may cause that all users are congested in some specific access points, since the users may not be distributed uniformly in the same building and these access points may have different power magnitudes, such that networks of the specific access points may be congested, but other access points may be idle.

SUMMARY OF THE INVENTION

It is therefore an objective of the present invention to provide a load balancing method for a wireless communication device, in order to solve the network congestion problem of the wireless communication device.

The present invention discloses a load balancing method for a wireless communication device. The load balancing method comprises checking a total loading of the wireless communication device, wherein the total loading comprises a first loading of an omni antenna and a second loading of a directional antenna; and adjusting transmission power of the wireless communication device according to the total loading of the wireless communication device and information sent by at least one neighbor wireless communication device, in order to perform load balancing.

The present invention further discloses a wireless communication device. The wireless communication device comprises a wireless module, for receiving information sent by at least one neighbor wireless communication device, the wireless module comprising an omni antenna and a directional antenna; a positioning unit, for confirming a location of the wireless communication device; and a processing unit, for checking a total loading of the wireless communication device and adjusting transmission power of the wireless communication device according to the total loading of the wireless communication device and information sent by the at least one neighbor wireless communication device in order to perform load balancing, wherein the total loading comprises a first loading of the omni antenna and a second loading of the directional antenna.

The present invention further discloses a wireless communication system comprising a first wireless communication device for performing load balancing and at least one second wireless communication device for performing load balancing. The first wireless communication device comprises a first wireless module, for transmitting or receiving location information and an assistance request, the first wireless module comprising a first omni antenna and a first directional antenna; a first positioning unit, for generating the location information; and a first processing unit, for checking a first total loading of the first wireless communication device and adjusting transmission power of the first wireless communication device according to the first total loading of the first wireless communication device in order to perform load balancing, wherein the first total loading comprises a first loading of the omni antenna and a second loading of the directional antenna. Each of the at least one second wireless communication device comprises a second wireless module, for receiving the location information and the assistance request, the second wireless module comprising a second omni antenna and a second directional antenna; a second positioning unit, for obtaining a location of the first wireless communication device according to the location information; and a second processing unit, for adjusting transmission power of the at least one second wireless communication device according to the assistance request, in order to perform load balancing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
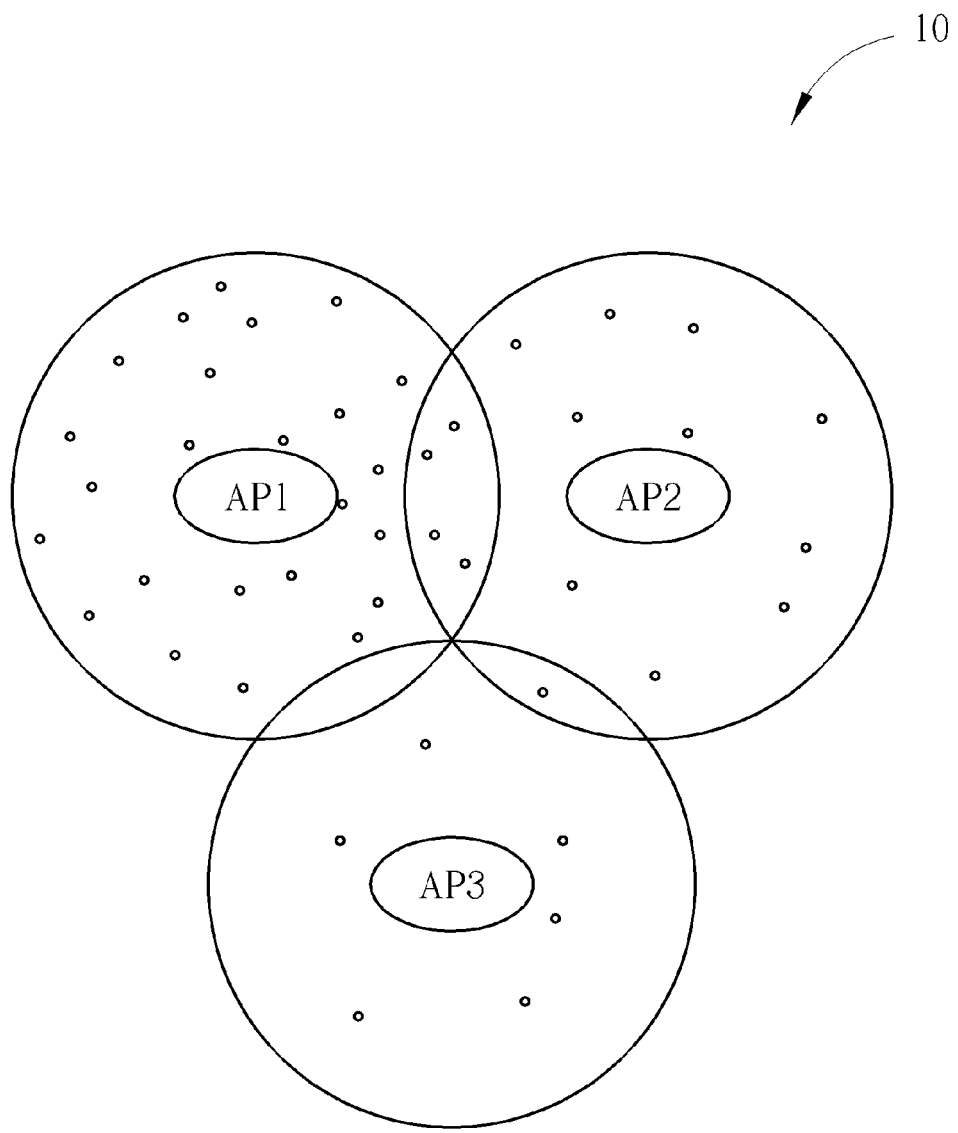
FIG. 1 is a schematic diagram of a wireless communication system according to an embodiment of the present invention.

Please refer to FIG. 1, which is a schematic diagram of a wireless communication system 10 according to an embodiment of the present invention. The wireless communication system 10 includes wireless communication devices AP1, AP2 and AP3 (for simplicity, only three wireless communication devices are illustrated in this embodiment, which is not limited herein) and a plurality of users (denoted by points in FIG. 1). The wireless communication devices AP1, AP2 and AP3 can be access points, which perform communication with one or several users (e.g. mobile phones, laptops or other portable communication devices) in a wireless manner. The coverage of the wireless communication device AP1 is Z1, the coverage of the wireless communication device AP2 is Z2, and the coverage of the wireless communication device AP3 is Z3. The users are not distributed uniformly in the coverage Z1, Z2 and Z3, such that the network congestion occurs in the wireless communication device AP1.

Figure 2A:
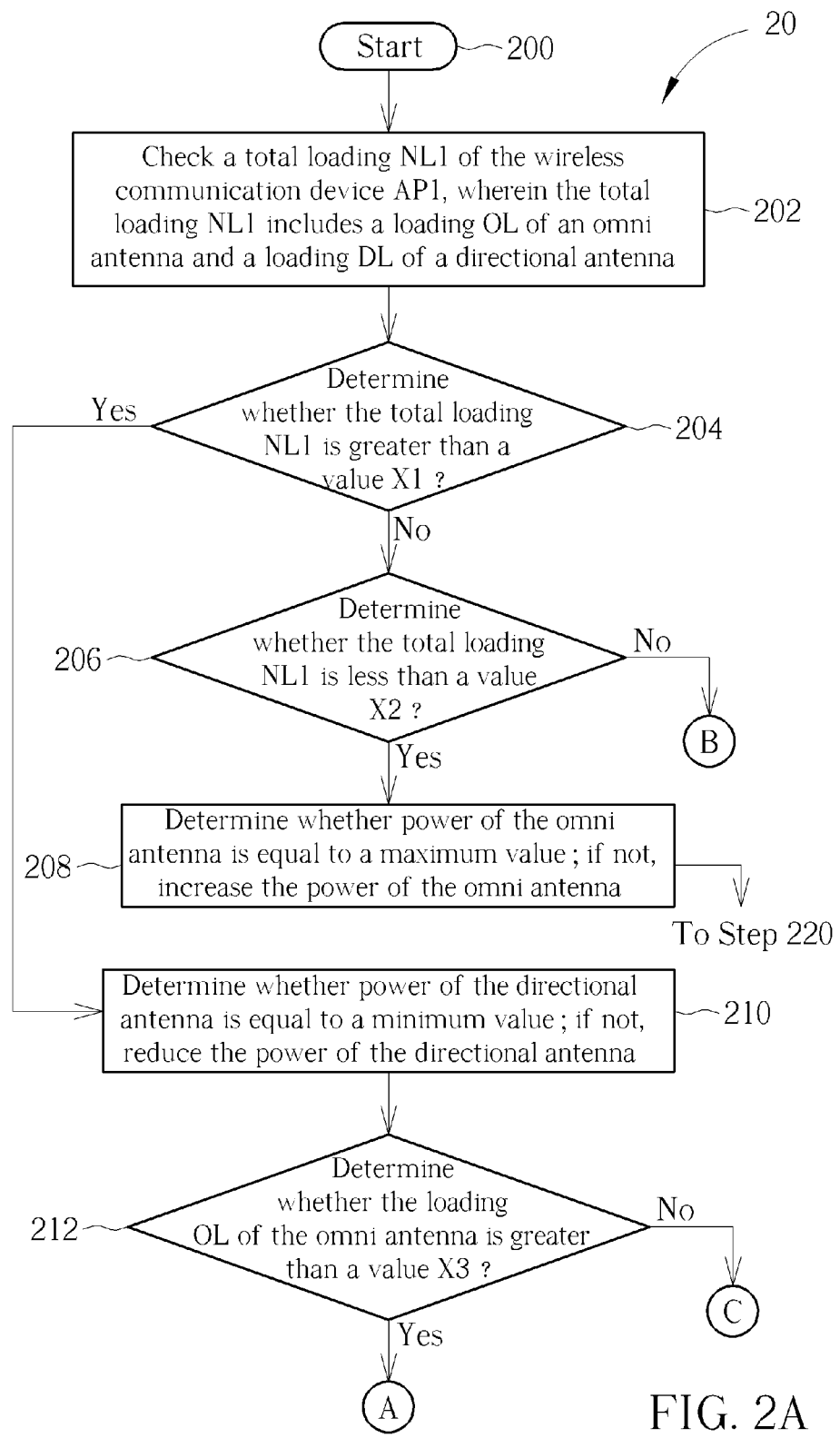
FIG. 2A and FIG. 2B are schematic diagrams of a process according to an embodiment of the present invention.
Figure 2B:
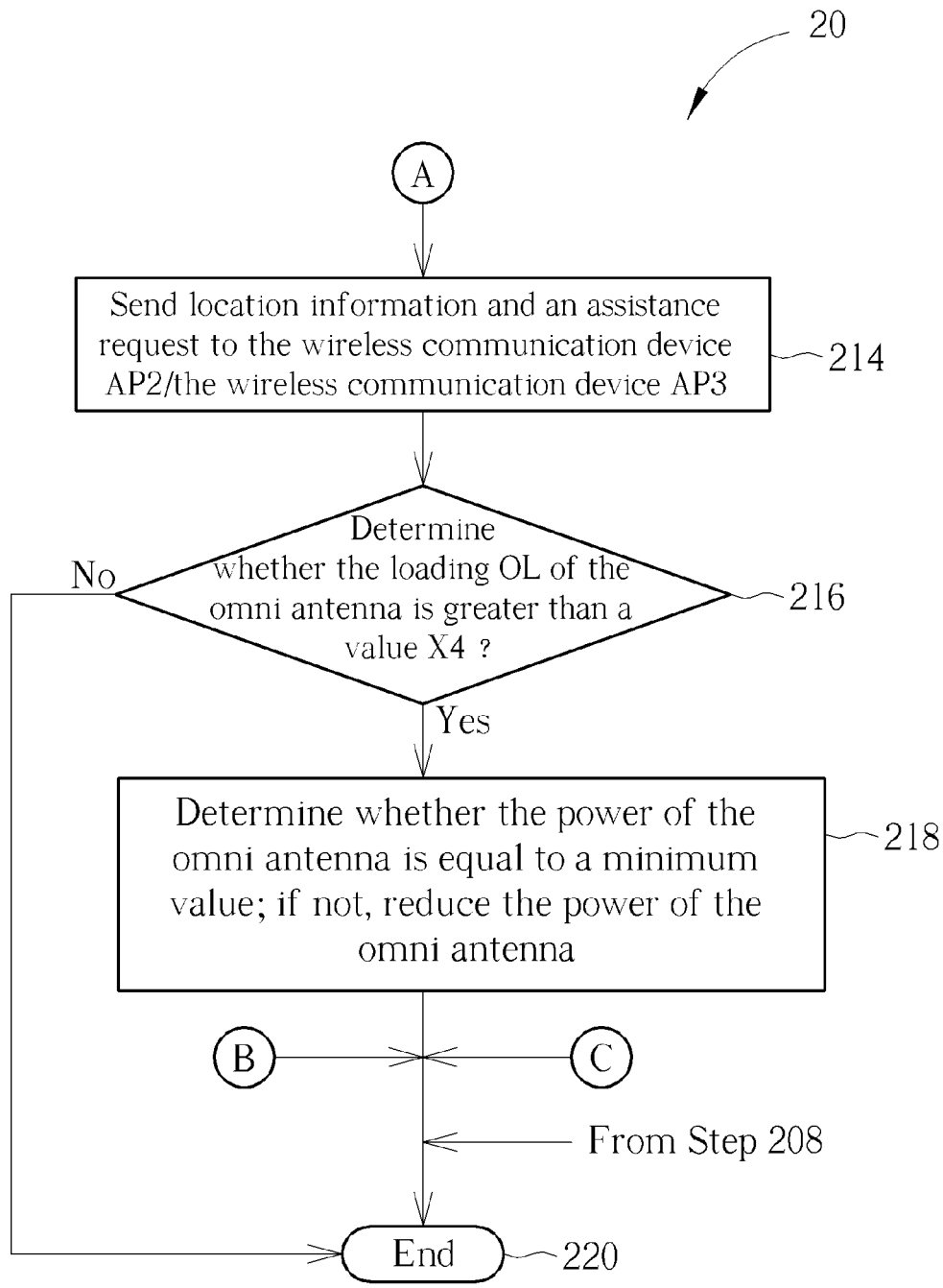
Figure 3:
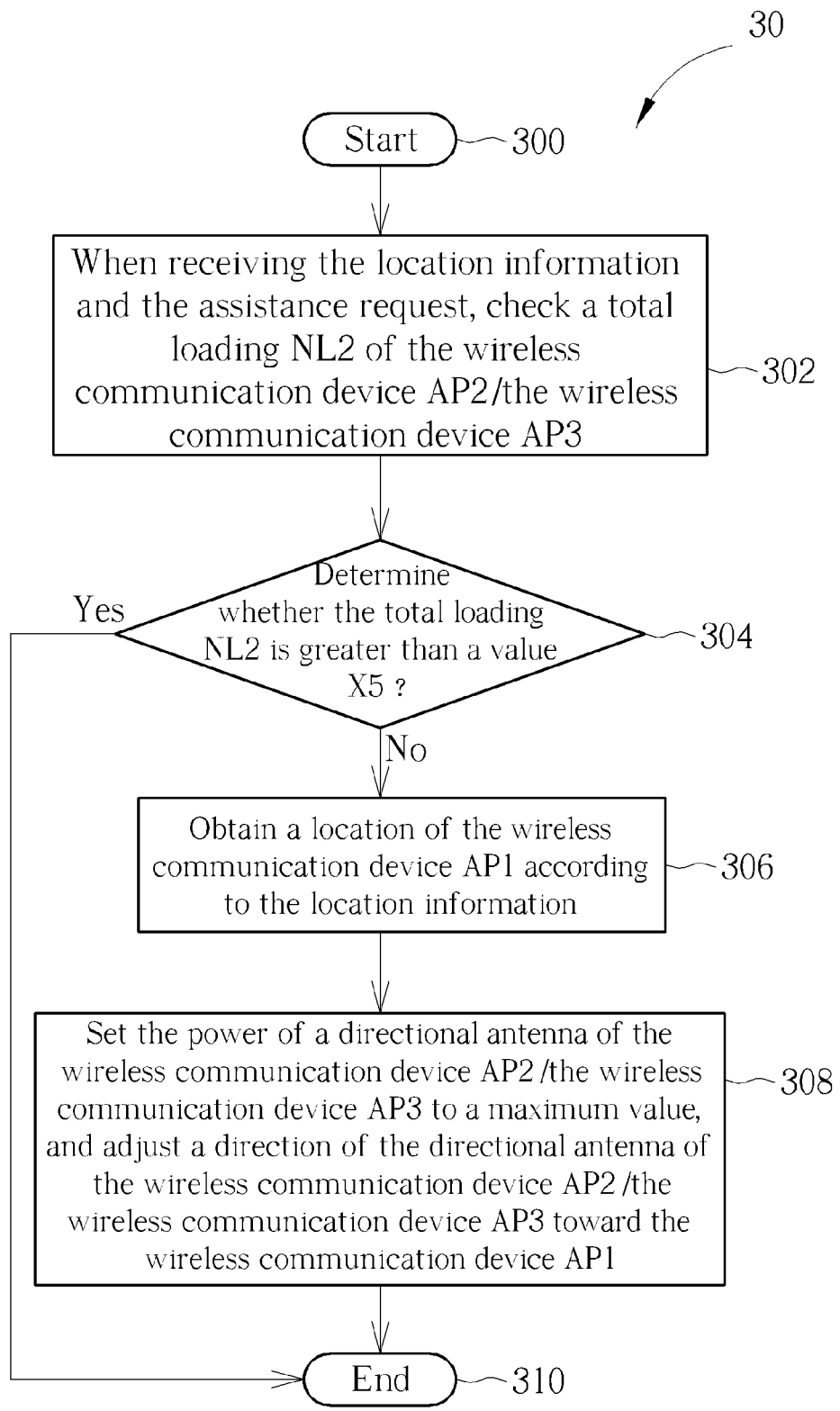
FIG. 3 is a schematic diagram of a process according to an embodiment of the present invention.

Please refer to FIG. 1, FIG. 2A and FIG. 2B simultaneously. FIG. 2A and FIG. 2B are schematic diagrams of a process 20 according to an embodiment of the present invention. The process 20 is utilized in the wireless communication device AP1 shown in FIG. 1 for performing load balancing. The process 20 includes the following steps:

Step 200: Start.

Step 202: Check a total loading NL1 of the wireless communication device AP1, wherein the total loading NL1 includes a loading OL of an omni antenna and a loading DL of a directional antenna.

Step 204: Determine whether the total loading NL1 is greater than a value X1? If yes, go to Step 210; otherwise, go to Step 206.

Step 206: Determine whether the total loading NL1 is less than a value X2? If yes, go to Step 208; otherwise, go to Step 220.

Step 208: Determine whether power of the omni antenna is equal to a maximum value? If not, increase the power of the omni antenna.

Step 210: Determine whether power of the directional antenna is equal to a minimum value? If not, reduce the power of the directional antenna.

Step 212: Determine whether the loading OL of the omni antenna is greater than a value X3? If yes, go to Step 214; otherwise, go to Step 220.

Step 214: Send location information and an assistance request to the wireless communication device AP2/the wireless communication device AP3.

Step 216: Determine whether the loading OL of the omni antenna is greater than a value X4? If yes, go to Step 218; otherwise, go to Step 220.

Step 218: Determine whether the power of the omni antenna is equal to a minimum value? If not, reduce the power of the omni antenna.

Step 220: End.

According to the process 20, when there are too many users existing in the coverage Z1 of the wireless communication device AP1 causing the network congestion, the wireless communication device AP1 can adjust transmission power of the wireless communication device AP1, in order to perform load balancing. First of all, the wireless communication device AP1 checks whether the total loading NL1 itself is greater than the value X1. If the total loading NL1 is not greater than the value X1, the wireless communication device AP1 then determines whether the total loading NL1 is less than the value X2. If the total loading NL1 is less than the value X2, the wireless communication device AP1 may determine first whether the power of the omni antenna is equal to the maximum value. If not, the wireless communication device AP1 may increase the power of the omni antenna. If the total loading NL1 is greater than the value X1, the wireless communication device AP1 may determine whether the power of the directional antenna is equal to the minimum value. If not, the wireless communication device AP1 may reduce the power of the directional antenna. The wireless communication device AP1 then determines whether the loading OL of the omni antenna is greater than the value X3. If the loading OL is greater than the value X3, the wireless communication device AP1 sends the location information and the assistance request to the wireless communication device AP2/the wireless communication device AP3, in order to ask for help from the wireless communication device AP2/the wireless communication device AP3 to share the loading of the wireless communication device AP1. When the loading OL is greater than the value X4, the wireless communication device AP1 may determine whether the power of the omni antenna is equal to the minimum value. If not, the wireless communication device AP1 may reduce the power of the omni antenna. Preferably, the value X1 is greater than the value X3 and the value X4 is greater than the value X3. For example, X1 may be 90%, X2 may be 50%, X3 may be 80%, and X4 may be 95%. That is, when the wireless communication device AP1 determines the total loading NL1 is greater than 90%, the wireless communication device AP1 may determine whether the power of the directional antenna is equal to the minimum value. If not, the wireless communication device AP1 may reduce the power of the directional antenna. When the wireless communication device AP1 determines the total loading NL1 is less than 50%, the wireless communication device AP1 increases the power of the omni antenna. When the wireless communication device AP1 determines the loading OL is greater than 80%, the wireless communication device AP1 sends the location information and the assistance request to the wireless communication device AP2/the wireless communication device AP3. When the wireless communication device AP1 determines the loading OL is greater than 95%, the wireless communication device AP1 may determine whether the power of the omni antenna is equal to the minimum value. If not, the wireless communication device AP1 may reduce the power of the omni antenna. Please note that, those skilled in the art can determine the values X1, X2, X3 and X4 according to congestion status of the network, which is not limited herein.

Furthermore, the wireless communication device AP1 can reduce the power of the omni antenna or the directional antenna progressively. The wireless communication device AP1 first checks the power of the wireless communication device AP1. If the output power of the wireless communication device AP1 has not reached down to the minimum value, the wireless communication device AP1 reduces the output power by 0.5 dBm. The wireless communication device AP1 can increase the power of the omni antenna or the directional antenna progressively. The wireless communication device AP1 first checks the power of the wireless communication device AP1. If the output power of the wireless communication device AP1 has not reached the maximum value, the wireless communication device AP1 increases the output power by 0.5 dBm.

On the other hand, when the wireless communication device AP2/the wireless communication device AP3 receives the location information and the assistance request, the wireless communication device AP2/the wireless communication device AP3 performs a process 30, in order to perform load balancing. The process 30 includes the following steps:

Step 300: Start.

Step 302: When receiving the location information and the assistance request, check a total loading NL2 of the wireless communication device AP2/the wireless communication device AP3.

Step 304: Determine whether the total loading NL2 is greater than a value X5? If yes, go to Step 310; otherwise, go to Step 306.

Step 306: Obtain a location of the wireless communication device AP1 according to the location information.

Step 308: Set the power of a directional antenna of the wireless communication device AP2/the wireless communication device AP3 to a maximum value, and adjust a direction of the directional antenna of the wireless communication device AP2/the wireless communication device AP3 toward the wireless communication device AP1.

Step 310: End.

According to the process 30, when the wireless communication device AP2/the wireless communication device AP3 receives the location information and the assistance request, the total loading NL2 of the wireless communication device AP2/the wireless communication device AP3 is checked. If the total loading NL2 is less than the value X5, the wireless communication device AP2/the wireless communication device AP3 is able to share the loading of the wireless communication device AP1. Therefore, the wireless communication device AP2/the wireless communication device AP3 may obtain the location of the wireless communication device AP1 according to the location information, and set the power of the directional antenna of the wireless communication device AP2/the wireless communication device AP3 to the maximum value. The wireless communication device AP2/the wireless communication device AP3 further adjusts the direction of the directional antenna of the wireless communication device AP2/the wireless communication device AP3 toward the wireless communication device AP1. Therefore, based on the above processes 20 and 30, if the network congestion occurs in the wireless communication system 10 (e.g. too many users congested in specific wireless communication devices), the wireless communication devices AP1, AP2 and AP3 can coordinate themselves to perform load balancing, in order to solve the network congestion problem.

Please note that, the processes 20 and 30 can be performed on the same wireless communication device, and is not limited to be performed on two different wireless communication devices. That is, when total loading of a wireless communication device is too large, the wireless communication device can request a neighbor wireless communication device to share the loading. When total loading of the neighbor wireless communication device is too large, the wireless communication device can also perform load balancing to share this loading. As a result, load balancing can be achieved in the wireless communication system through the negotiation between a plurality of wireless communication devices.

Figure 4:
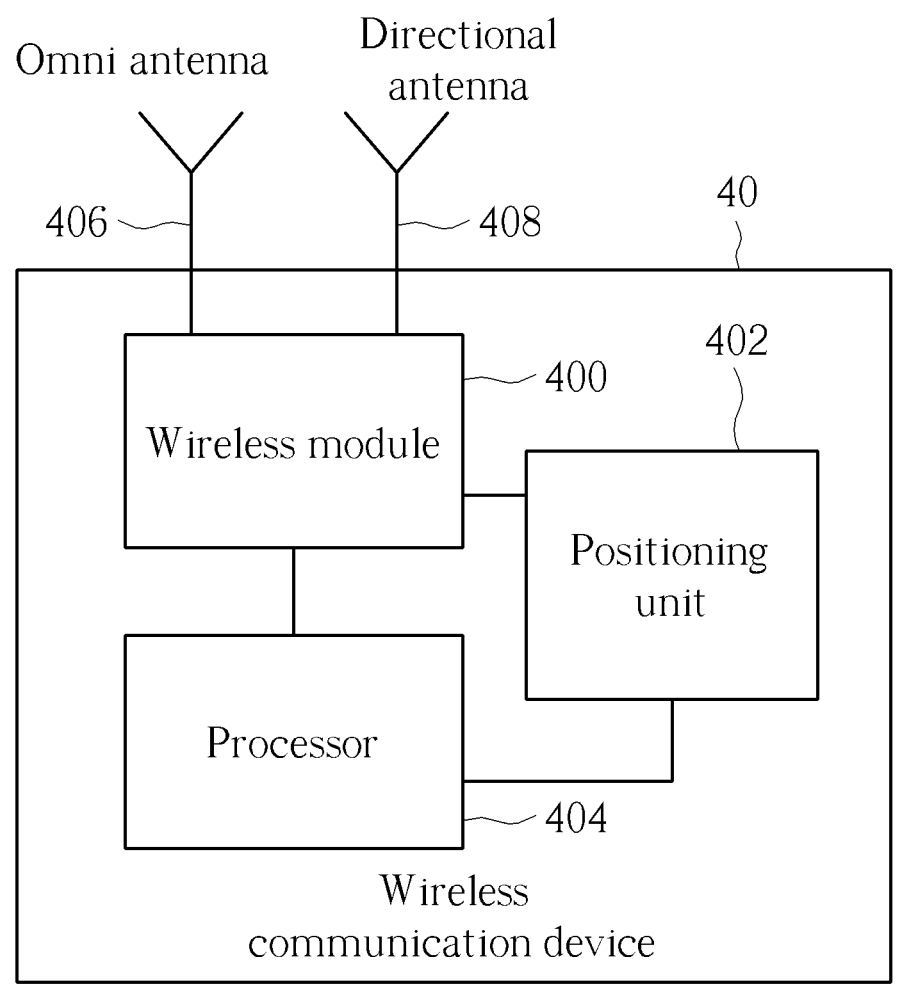
FIG. 4 is a schematic diagram of a wireless communication device according to an embodiment of the present invention.

Please refer to FIG. 4, which is a schematic diagram of a wireless communication device 40 according to an embodiment of the present invention. The wireless communication device 40 can implement the above wireless communication devices AP1, AP2 and AP3. The wireless communication device 40 includes a wireless module 400, a positioning unit 402 and a processor 404. The wireless module 400 is utilized for transmitting/receiving wireless data (e.g. location information and assistance request). The wireless module 400 includes an omni antenna 406 and a directional antenna 408. Direction of the directional antenna can be adjusted arbitrarily, in order to facilitate receiving/transmitting the wireless data. The positioning unit 402 is utilized for performing positioning to obtain the location of the neighbor wireless communication device according to the received wireless data. The processor 404 is utilized for checking a total loading of the wireless communication device 40 and adjusting (increasing or reducing) transmission power of the omni antenna 406 and the directional antenna 408 according to the total loading of the wireless communication device 40 and the received wireless information, in order to perform load balancing. Detailed operations of the wireless communication device 40 are illustrated in the above processes 20 and 30, and will not be narrated herein.

To sum up, when there are too many users existing in the coverage of a wireless communication device causing the network congestion, the wireless communication device checks whether the total loading itself is greater than a first value. If the total loading is greater than the first value, the wireless communication device reduces the power of the directional antenna. The wireless communication device then determines whether the loading of the omni antenna is greater than a second value. If the loading of the omni antenna is greater than the second value, the wireless communication device sends location information and assistance request to the neighbor wireless communication device, in order to ask for help from the neighbor wireless communication device to share the loading of the wireless communication device. When the loading of the omni antenna is greater than a third value, the wireless communication device reduces power of the omni antenna. On the other hand, when the neighbor wireless communication device receives the location information and the assistance request, the neighbor wireless communication device checks its total loading. If the neighbor wireless communication device determines its total loading is less than a fourth value, the neighbor wireless communication device may obtain the location of the wireless communication device according to the location information, and set the power of the directional antenna to a maximum value. The neighbor wireless communication device further adjusts the direction of the directional antenna toward the wireless communication device. In short, the wireless communication device with a huge loading can send the location information and the assistance request to the neighbor wireless communication device, in order to perform load balancing. After receiving the assistance request, the neighbor wireless communication device can share the excess loading. Therefore, the wireless communication devices can coordinate themselves to perform load balancing, in order to solve the network congestion problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A load balancing method for a wireless communication device, the load balancing method comprising:

checking a total loading of the wireless communication device, wherein the total loading comprises a first loading of an omni antenna and a second loading of a directorial antenna; and adjusting transmission power of the omni antenna and the directional antenna according to the total loading of the wireless communication device and information sent by at least one neighbor wireless communication device, in order to perform load balancing;

wherein the step of adjusting the transmission power of the omni antenna and the directional antenna according to the total loading of the wireless communication device in order to perform load balancing comprises:

reducing power of the directional antenna when determining the total loading is greater than a first value;

sending location information of the wireless communication device and an assistance request to the at least one neighbor wireless communication device when determining the first loading is greater than a second value; and reducing power of the omni antenna when determining the first loading is greater than a third value.

2. The load balancing method of claim 1, wherein the step of adjusting the transmission power of the omni antenna and the directional antenna according to the total loading of the wireless communication device in order to perform load balancing further comprises:

increasing power of the omni antenna when determining the total loading is less than a value.

3. The load balancing method of claim 1, wherein the first value is greater than the second value and the third value is greater than the second value.

4. The load balancing method of claim 1, wherein the step of adjusting the transmission power of the omni antenna and the directional antenna according to the information sent by the at least one neighbor wireless communication device in order to perform load balancing comprises:

checking the total loading of the wireless communication device when receiving the information sent by the at least one neighbor wireless communication device, wherein the information sent by the at least one neighbor wireless communication device comprises location information of the at least one neighbor wireless communication device and an assistance request from the at least one neighbor wireless communication device;

obtaining a location of the at least one neighbor wireless communication device according to the location information of the at least one neighbor wireless communication device when determining the total loading is less than a value; and setting power of the directional antenna to a maximum value, and adjusting a direction of the directional antenna toward the at least one neighbor wireless communication device.

5. A wireless communication device, comprising:

a wireless module, for receiving information sent by at least one neighbor wireless communication device, the wireless module comprising:
an omni antenna; and
a directional antenna;

a positioning unit, for confirming a location of the wireless communication device; and a processing unit, for checking a total loading of the wireless communication device and adjusting transmission power of the omni antenna and the directional antenna according to the total loading of the wireless communication device and information sent by the at least one neighbor wireless communication device in order to perform load balancing, wherein the total loading comprises a first loading of the omni antenna and a second loading of the directional antenna;

wherein the processing unit adjusting the transmission power of the omni antenna and the directional antenna according to the total loading of the wireless communication device in order to perform load balancing comprises:

the directional antenna reducing power of the directional antenna when the processing unit determining the total loading is greater than a first value;

the directional antenna sending location information of the wireless communication device and an assistance request to the at least one neighbor wireless communication device when the processing unit determining the first loading is greater than a second value; and the omni antenna reducing power of the omni antenna when the processing unit determining the first loading is greater than a third value.

6. The wireless communication device of claim 5, wherein the processing unit adjusting the transmission power of the omni antenna and the directional antenna according to the total loading of the wireless communication device in order to perform load balancing further comprises:

the omni antenna increasing power of the omni antenna when the processing unit determining the total loading is less than a value.

7. The wireless communication device of claim 5, wherein the first value is greater than the second value and the third value is greater than the second value.

8. The wireless communication device of claim 5, wherein the processing unit adjusting the transmission power of the omni antenna and the directional antenna according to the information sent by the at least one neighbor wireless communication device in order to perform load balancing comprises:

the processing unit checking the total loading when the omni antenna and the directional antenna receiving the information sent by the at least one neighbor wireless communication device, wherein the information sent by the at least one neighbor wireless communication device comprises location information of the at least one neighbor wireless communication device and an assistance request from the at least one neighbor wireless communication device;

the positioning unit obtaining a location of the at least one neighbor wireless communication device according to the location information of the at least one neighbor wireless communication device when the processing unit determining the total loading is less than a value; and the processing unit setting power of the directional antenna to a maximum value, and adjusting a direction of the directional antenna toward the at least one neighbor wireless communication device.

9. A wireless communication system, comprising:

a first wireless communication device, for performing load balancing, the first wireless communication device comprising:
a first wireless module, for transmitting or receiving location information and an assistance request, the first wireless module comprising:
a first omni antenna; and
a first directional antenna;
a first positioning unit, for generating the location information; and
a first processing unit, for checking a first total loading of the first wireless communication device and adjusting transmission power of the first omni antenna and the first directional antenna according to the first total loading of the first wireless communication device in order to perform load balancing, wherein the first total loading comprises a first loading of the first omni antenna and a second loading of the first directional antenna; and at least one second wireless communication device, for performing load balancing, each of the at least one second wireless communication device comprising:
- a second wireless module, for receiving the location information and the assistance request, the second wireless module comprising:
  - a second omni antenna; and
  - a second directional antenna;
- a second positioning unit, for obtaining a location of the first wireless communication device according to the location information; and
- a second processing unit, for adjusting transmission power of the at least one second wireless communication device according to the assistance request, in order to perform load balancing;

wherein the first processing unit adjusting the transmission power of the first omni antenna and the first directional antenna according to the first total loading of the first wireless communication device in order to perform load balancing comprises:
- the first directional antenna reducing power of the first directional antenna when the first processing unit determining the first total loading is greater than a first value;
- the first directional antenna sending the location information of the wireless communication device and the assistance request to the at least one second neighbor wireless communication device when the first processing unit determining the first loading is greater than a second value; and
- the first omni antenna reducing power of the first omni antenna when the first processing unit determining the first loading is greater than a third value.

10. The wireless communication system of claim 9, wherein the first processing unit adjusting the transmission power of the first omni antenna and the first directional antenna according to the first total loading of the first wireless communication device in order to perform load balancing further comprises:
- the first omni antenna increasing power of the first omni antenna when the first processing unit determining the first total loading is less than a value.

11. The wireless communication system of claim 9, wherein the first value is greater than the second value and the third value is greater than the second value.

12. The wireless communication system of claim 9, wherein the second processing unit adjusting the transmission power of each of the at least one second wireless communication device according to the assistance request in order to perform load balancing comprises:
- the second processing unit checking a second total loading of each of the at least one second wireless communication device when the second wireless module receiving the assistance request;
- the second positioning unit obtaining the location of the first wireless communication device according to the location information when the second processing unit determining the second total loading is less than a value; and
- the second processing unit setting power of the second directional antenna to a maximum value, and adjusting a direction of the second directional antenna toward the first wireless communication device.

* * * * *